United States Patent [19]

Ueda et al.

[11] Patent Number: 4,972,216

[45] Date of Patent: Nov. 20, 1990

[54] CAMERA HAVING A REAL-IMAGE VIEWFINDER

[75] Inventors: Hiroshi Ueda; Takeo Hoda; Nobuyuki Taniguchi; Yoshinobu Kudo; Manabu Inoue; Yoshiaki Hata, all of Osaka, Japan

[73] Assignee: Minolta Camera Kabushiki Kaisha, Osaka, Japan

[21] Appl. No.: 382,542

[22] Filed: Jul. 19, 1989

[30] Foreign Application Priority Data

Jul. 20, 1988 [JP] Japan .................. 63-179236

[51] Int. Cl.⁵ .................................. G03B 13/08
[52] U.S. Cl. ........................................ 354/225
[58] Field of Search ............... 354/219, 222, 224, 225, 354/403, 478, 155, 166, 199; 352/171

[56] References Cited

U.S. PATENT DOCUMENTS

| | | | |
|---|---|---|---|
| 3,842,424 | 10/1974 | Tsunekawa et al. | 354/478 X |
| 4,639,111 | 1/1987 | Harvey | 354/222 X |
| 4,728,978 | 3/1988 | Inoue et al. | 354/289.1 |
| 4,743,932 | 5/1988 | Matsui | 354/403 |

OTHER PUBLICATIONS

Modern Photography, Apr. 1989, pp. 50-57.
Modern Photography, May 1986, pp. 44-54.

Primary Examiner—Brian W. Brown
Attorney, Agent, or Firm—Price, Gess & Ubell

[57] ABSTRACT

A camera having a real-image viewfinder incorporating an optical finder system having the functions of an optical system for automatical focusing or an optical system for automatic exposure. The optical finder system comprises an objective lens having a positive power, an eyepiece, and an optical system such as porro mirror, disposed between the objective lens and the eyepiece and comprising a plurality of mirrors and/or a prism. Some of the mirrors a semitransparent mirrors capable of dividing the incident light for two optical paths. One part of the incident light is transmitted to the eyepiece and the other part of the incident light is transmitted to light receiving elements, which are disposed in substantially conjugate planes with respect to the focal plane of the objective lens, respectively for distance measurement and light measurement.

12 Claims, 5 Drawing Sheets

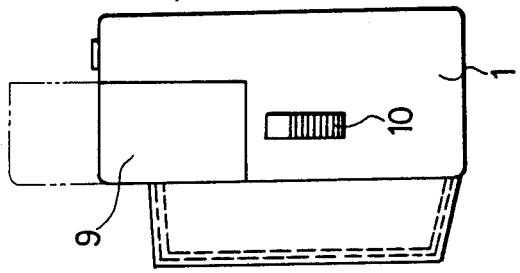
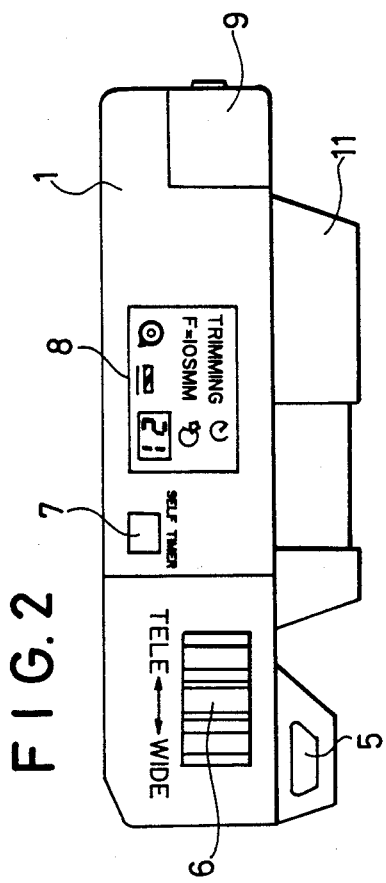
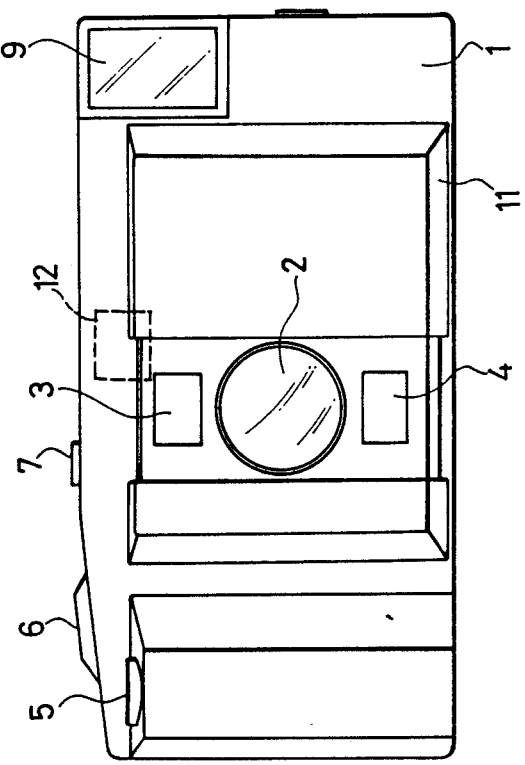

CAMERA HAVING A REAL-IMAGE VIEWFINDER

BACKGROUND OF THE INVENTION

1. Field of the Invention

The present invention relates to an individual real-image optical viewfinder separate from a photographic lens system.

2. Description of the Prior Art

The recent compact camera of a lens shutter system, as well as the single-lens reflex camera of an interchangeable lens system, is equipped with an automatic exposure control system (hereinafter referred to as "AE") and an automatic focusing system (hereinafter referred to as "AF"). The compact camera is equipped with an optical viewfinder system, an optical system for automatic focusing and an optical system for automatic exposure, which are separate from each other.

Some compact cameras are capable of photographing in either a normal mode or a trimming mode (pseudo telephoto mode) for obtaining a telephotographic print without varying the focal length of the photographic lens. When the compact camera is set for a trimming mode, the size of the field frame within the viewfinder is adjusted to a size corresponding to that for telephotography to indicate a printing area of the trimming mode, and trimming data is recorded in the margin of the film, an IC card, a semiconductor memory and so on. In developing a film carrying pictures taken by such a compact camera, the trimming data recorded on the film, the IC card and so on is read, and the frames of the film are trimmed and enlarged in conformity to the trimming data to obtain prints simulating telephotographic prints.

A camera capable of recording trimming data on the film, an IC card and so on for use in trimming and printing process is disclosed, for example, in U.S. Pat. No. 4,728,978.

Incidentally, when an optical viewfinder system, an optical system for AF and an optical system for AE are provided separately in a camera, the range of distance measurement and the range of light measurement indicated within the viewfinder deviate from the actual range of them due to parallax. Moreover, in a camera capable of photographing at a trimming mode, the actual range of distance measurement and the actual range of light measurement are different in size from the ranges of distance measurement and light measurement indicated in the object field of the viewfinder, when the size of the object field of the viewfinder is changed for photographing at the trimming ratio.

Furthermore, when a photographic optical system, an optical viewfinder system and optical systems for measuring distance or brightness are provided separately in a camera, the camera needs a large space for containing those optical systems. Thus, the separate arrangement of those optical systems in a camera under limitative conditions makes forming the camera in a comparatively small size difficult, increases the component parts, and places restrictions on the design of the external appearance of the camera.

SUMMARY OF THE INVENTION

It is a principal object of the present invention to provide a camera having a novel real-image viewfinder, providing a universal optical system having the functions of an optical viewfinder system, an optical system for AF, and an optical system for AE.

The above and other objects, features and advantages of the present invention will become apparent from the following description taken in conjunction with the accompanying drawings.

BRIEF DESCRIPTION OF THE DRAWINGS

FIG. 1 is a front elevation of a camera provided with a real-image viewfinder in accordance with the present invention;

FIG. 2 is a top plan view of the camera of FIG. 1;

FIG. 3 is a side elevation of the camera of FIG. 1;

DETAILED DESCRIPTION OF THE PREFERRED EMBODIMENTS

Figure 4:
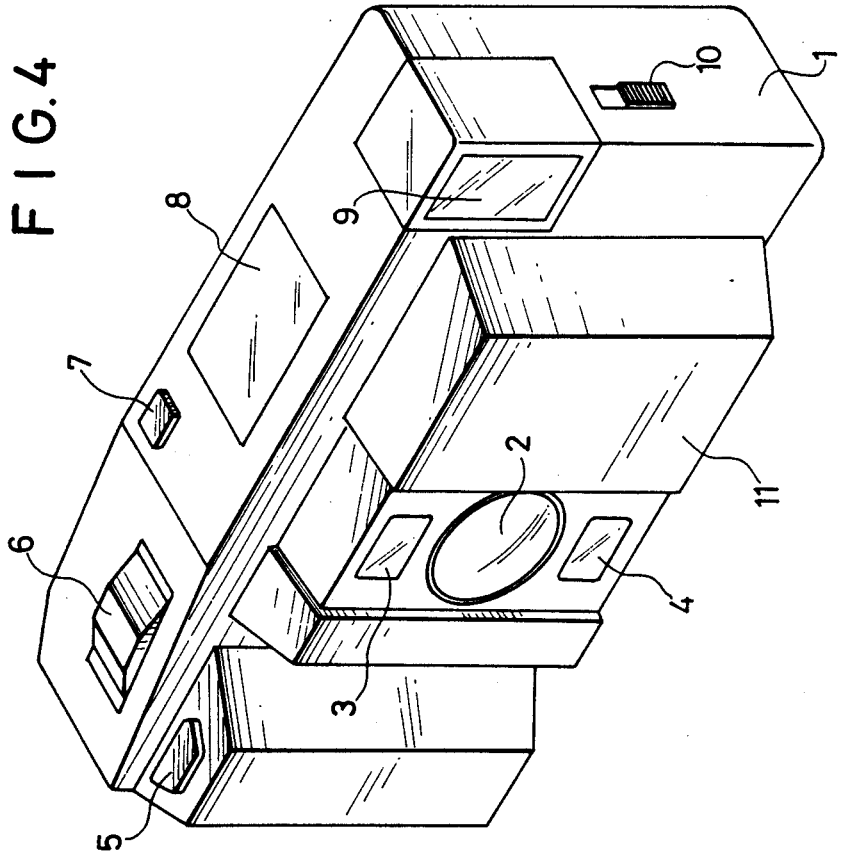
FIG. 4 is a perspective view of the camera of FIG. 1.
Figure 5:
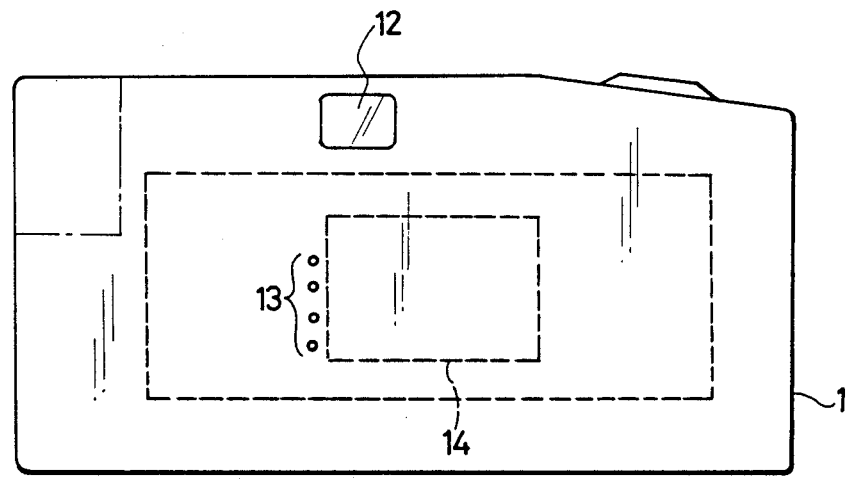
FIG. 5 is a rear elevation of the camera of FIG. 1, showing the position of a frame of a film and the arrangement of light emitting diodes for forming the image of a trimming code on the film.

Referring to FIGS. 1 to 4 showing a camera equipped with a real-image viewfinder in accordance with the present invention, there are shown a camera body 1, a photographic lens 2, an objective lens 3 incorporated into the optical finder system, an aperture through which an auxiliary light for AF is projected, a release button 5, a trimming ratio selector knob 6, a self-timer setting button 7, a liquid crystal display panel 8 for displaying photographing data including a selected trimming ratio, the focal length of the taking lens 2 and the number of exposed frames, a flash emitting gun 9, a switch 10 for a flash circuit, a lens cover 11 for protecting the taking lens 2, and an eyepiece 12 of the optical finder system. The trimming ratio selector knob 6 is operated to select a trimming ratio for obtaining a picture analogous with a picture taken by a lens having a desired focal length in the range of the focal length of a standard lens (wide-angle lens) to the focal length of a telephoto lens. When the trimming ratio selector knob 6 is operated, the objective lens 3 (zoom lens) of the optical finder system zooms to vary the magnification of an image formed within the viewfinder so that a photographing area corresponding to the magnification can be seen in the viewfinder to enable the selection of a desired magnification, namely, a desired trimming ratio. When the camera is operated for photographing after selecting a desired trimming ratio, the light emitting diodes 13 (FIG. 5) arranged beside an image window 14 imprints a trimming code indicating the selected trimming ratio. In processing the exposed film at a photofinishing laboratory for printing, a printing machine reads the trimming code and trims an image taken at the trimming ratio to print the image of a magnification recognized by observing an image formed in the viewfinder. Normally, the trimming ratio selector knob 6 is biased to a standard position by a spring, so that the trimming ratio selector knob 6 is moved from the standard position to a position for a wide-angle photographing, or to a position for a telephoto photographing. The disposition of the trimming ratio selector knob 6 near the shutter release button 5 in the upper wall of the camera body 1 as shown in FIG. 4 facilitates the operation of the trimming ratio selector knob 6.

The camera is provided with an auxiliary beam projecting unit for projecting a light pattern to make the contrast of an object high when it is difficult to detect focusing condition because an objective field is dark or the contrast of an object is not sufficiently high. The auxiliary light projecting aperture 4 is provided in the front wall of the camera body 1 as shown in FIGS. 1 and 4.

Figure 6:
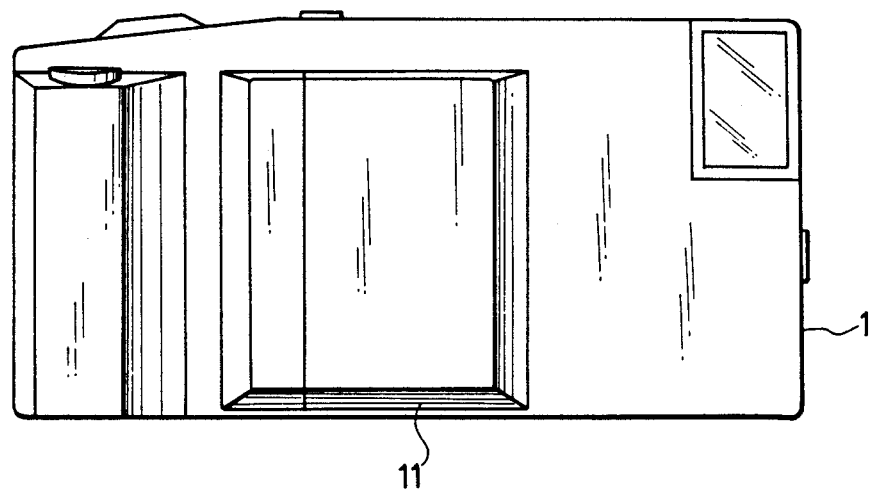
FIG. 6 is a front elevation of the camera of FIG. 1, in which a lens cover is closed.

The lens cover 11 is slidable in lateral directions. In FIGS. 1 and 4, the lens cover 11 is opened, and in FIG. 6, the lens cover 11 is closed. The lens cover 11 covers the photographic lens 2, which is particularly important to ensure the optical performance of the camera, the objective lens 3 of the finder and the auxiliary light projecting aperture 4 to protect them from damages or dust.

Figure 7:
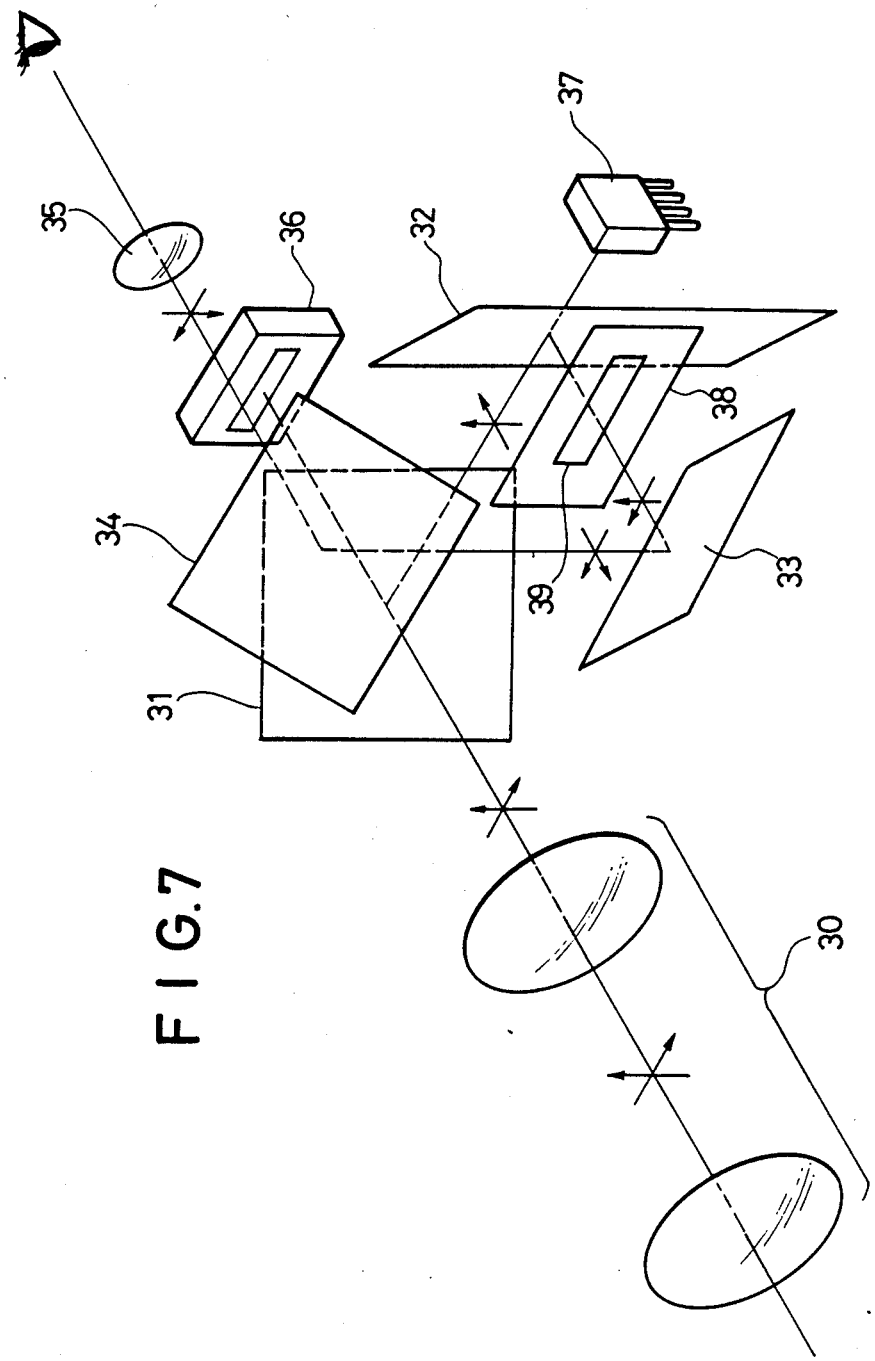
FIG. 7 is a perspective view of an optical finder system employed in a real-image viewfinder in a first embodiment according to the present invention.

The optical finder system employed in a real-image viewfinder in a first embodiment according to the present invention will be described hereinafter. Referring to FIG. 7, there are shown an objective zoom lens system 30, a Porro mirror system comprising four mirrors 31, 32, 33 and 34 for erecting an inverted image focused by the objective zoom lens system 30 to form an erect image, an eyepiece 35 of the optical finder system, a sensor module 36 for AF, a light receiving element 37 for AE, an object field frame 38, and an area mark 39 indicating an area of distance measurement and light measurement. The sensor module 36 is, for example, a known module of a phase-difference detecting system.

The optical finder system comprises the objective zoom lens 30, the Porro mirror system comprising the mirrors 31 to 34, and the eyepiece 35. The first mirror 31 and the second mirror 32 of the Porro mirror system are semitransparent mirrors. Part of the light transmitted through the objective zoom lens 30 travels through the first mirror 31 and falls on the sensor module 36. Part of the light transmitted through the objective zoom lens 30 and reflected by the first mirror 31 travels through the second mirror 32 and falls on the light receiving element 37.

The first mirror 31 of the Porro mirror system may be a semitransparent mirror which is transparent to infrared ray and reflective to visible ray. When such a semitransparent mirror is used as the first mirror 31, a sensor module having a high spectral sensitivity to rays in the infrared wavelength is used. The first mirror 31 may be a partially transparent mirror having totally reflective peripheral portion and a central transparent portion or a central portion provided with an aperture. When such a partially transparent mirror is used as the first mirror 31, the light transmitted through the objective zoom lens 30 travels through the central transparent portion or the aperture toward the sensor module 36. A mirror having a semitransparent central portion may be used for the same function.

The second mirror 32 also may be a partially transparent mirror having a totally reflective peripheral portion, and a transparent central portion or a central portion having an aperture, or may be a totally semitransparent or partially semitransparent mirror having a semitransparent central portion, capable of a reflecting part of visible ray toward the eyepiece 35 of the optical finder system and transmitting part of the visible ray toward the light receiving element 37. When the second mirror 32 is a semitransparent mirror, the surface of the second mirror 32 facing the light receiving element 37 is coated with an ultraviolet-ray reflecting film by a vapor deposition process to simplify the constitution of a light receiving unit including the light receiving element 37 by omitting the disposition of an ultraviolet absorbing filter in front of the light receiving element 37.

The object field frame 38 formed of a transparent material is located at the focal point of the objective zoom lens 30 and has a central transparent area corresponding to an object field, and a peripheral shading area. The area mark 39 for indicating an area of distance measurement and light measurement is formed in the central portion of the transparent area. An area mark indicating the area of distance measurement and an area mark indicating the area of light measurement may be formed separately instead of the area mark 39 depending on the concept of design.

The sensor module 36, the light receiving element 37 and the object field frame 38 are substantially optically conjugate. Therefore, although the range for distance measurement and the range for light measurement vary as the objective zoom lens 30 is zoomed, the ranges for distance measurement and light measurement always coincide with the area mark 39 on the object field frame 38, and hence there is no possibility of dislocation of the range of distance measurement and the range of light measurement from the area mark 39 because of parallax. The foregoing constitution is particularly advantageous for multipoint distance measurement and multipoint light measurement.

Figure 8:
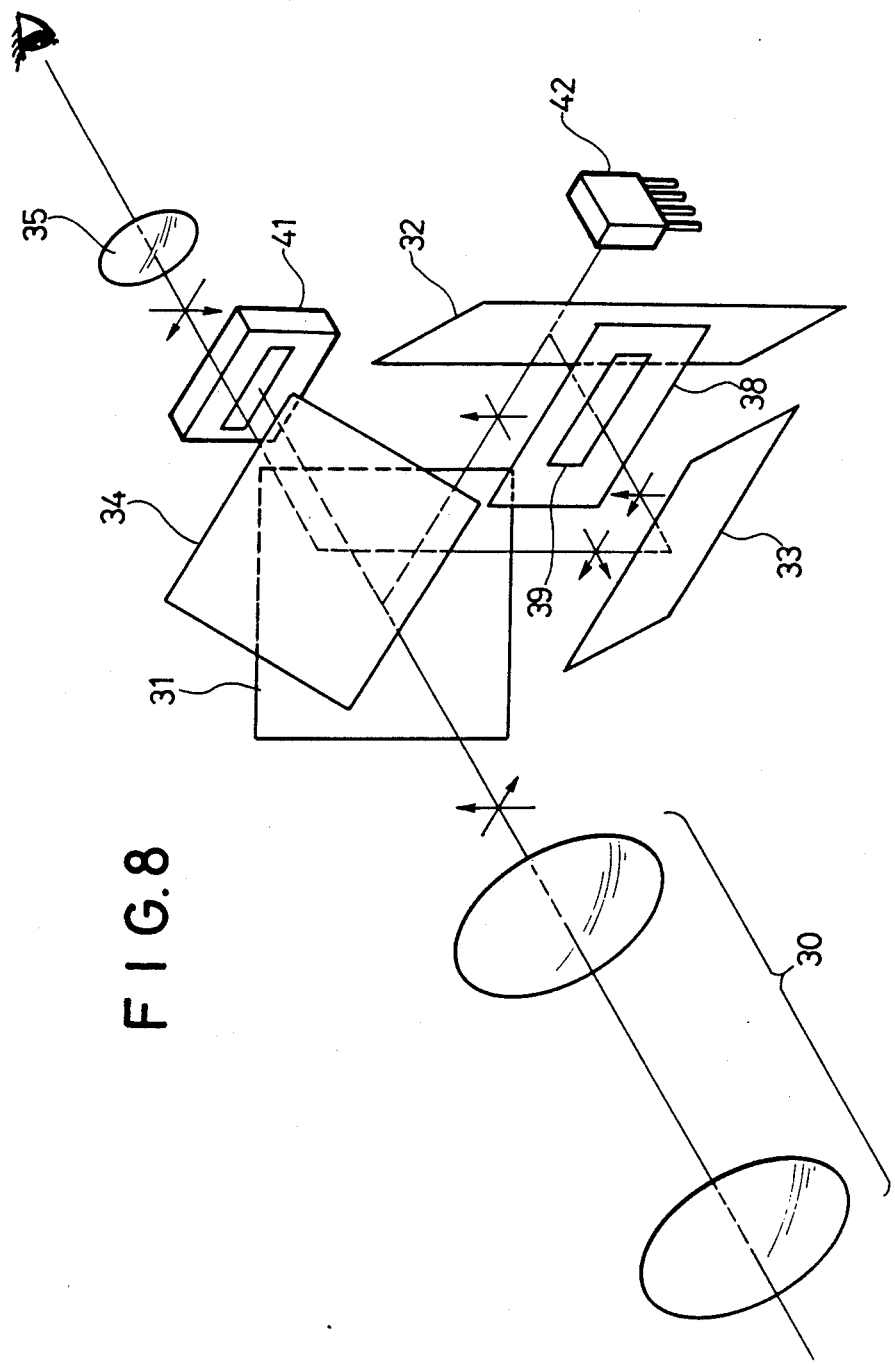
FIG. 8 is a perspective view of an optical finder system employed in a real-image viewfinder in a second embodiment according to the present invention.

An optical finder system employed in a real-image viewfinder in a second embodiment according to the present invention will be described hereinafter with reference to FIG. 8. The optical finder system shown in FIG. 8 is provided with means for projecting auxiliary light against an object for distance measurement when the object is not bright enough to enable focus detection.

The optical finder system of the second embodiment is substantially the same in construction as the optical finder system of the first embodiment, except that the optical finder system of the second embodiment is provided with an AF-AE module 41 integrally provided with a sensor module for AF and a light receiving element for AE, and an auxiliary light emitting element 42. The AF-AE module 41 is disposed at a position corresponding to that of the sensor module 36 of the first embodiment, and the auxiliary light emitting element 42 is disposed at a position corresponding to that of the light receiving element 37 of the first embodiment.

Light emitted from the auxiliary light emitting element 42 travels through the semitransparent mirror 32, is reflected by the semitransparent mirror 31, and travels further through the objective zoom lens 30 to an object. Since the optical path of the auxiliary light coincides with the optical path of the optical system for distance measurement, there is no parallax between the two optical paths, and hence accurate distance measuring operation is possible.

The camera incorporating the optical finder system of the second embodiment is not provided with the auxiliary light projecting aperture 4 shown in FIGS. 1 and 4.

The control operation for automatic focusing and automatic exposure using the output signals of the sensor module and the light receiving element is well known and is not related directly with the present invention, and hence the description thereof will be omitted.

Although the first and second embodiments of the present invention employ a Porro mirror system comprising a plurality of mirrors for converting an inverted image into an erect image, the Porro mirror system may be substituted by an equivalent optical system, such as a Porro prism, an Abbe prism, a combination of a mirror and a pentagonal roof prism, or a Pechen's prism.

As is apparent from the foregoing description, the real-image viewfinder in accordance with the present invention has the functions of both an optical system for distance measurement and an optical system for light measurement, and hence the real-image viewfinder is capable of carrying out distance measuring operation and light measuring operation without parallax, the range of distance measurement and the range of light measurement coincide with the measuring area indicated in the viewfinder even if an objective zoom lens is employed in the real-image viewfinder, so that an actual range of distance measurement and an actual range of light measurement in a trimming mode can be correctly recognized.

Furthermore, since the optical finder system employed in the real-image viewfinder of the present invention serves as both an optical system for distance measurement and an optical system for light measurement, a camera having a real-image viewfinder of the present invention comprises less component parts than an equivalent conventional camera and requires a reduced space for mounting an AF sensor module, a light receiving element for AF and so on, so that the real-image viewfinder of the present invention enables the camera to be formed in a reduced size and increases the degree of freedom of design.

What is claimed is:

1. A camera comprising:
   a photo-taking lens for forming an object image on a film;
   a viewfinder forming a real image, said viewfinder being independent from said photo-taking lens and having
      an objective lens distinct from said photo-taking lens,
      an eyepiece,
      an erecting system disposed in an optical path from said objective lens to said eyepiece;
   and
      first means, which is disposed on a plane being nearly conjugate to a predetermined image plane of said objective lens, for receiving light through said objective lens to generate data representing a relation between a position of said predetermined image plane and a position where an objective image formed by said objective lens is formed.

2. A camera as claimed in claim 1, wherein said erecting system has a partly penetrating means for penetrating a part of light from said objective lens and reflecting a part of the light, and said first receiving means is adapted to receive light penetrating through said partly penetrating means.

3. A camera as claimed in claim 2, said partly penetrating means is disposed in an optical path from said objective lens to said predetermined image plane.

4. A camera as claimed in claim 1, further comprising means, which is disposed on a plane being nearly conjugate to said predetermined image plane, for applying an auxiliary light for detection of the relation between a position of the predetermined plane and the image position.

5. A camera as claimed in claim 1, wherein said objective lens of said viewfinder is a zoom lens.

6. A camera as claimed in claim 1, further comprising second means, which is disposed on a plane being nearly conjugate to said predetermined image plane, for receiving light through said objective lens to generate data representing brightness of an object which is to be photographed.

7. A camera as claimed in claim 6, wherein said erecting system has a partly penetrating means for penetrating a part of light from said objective lens and reflecting a part of the light, and said second receiving means is adapted to receive light penetrating through said partly penetrating means.

8. A camera as claimed in claim 7, said partly penetrating means is disposed in an optical path from said objective lens to said predetermined image plane.

9. A camera comprising:
   a photo-taking lens for forming an object image on a film;
   a viewfinder forming a real image, which is independent from said photo-taking lens, said viewfinder having
      an objective lens distinct from said photo-taking lens,
      an eyepiece,
      an erecting system disposed in an optical path from said objective lens to said eyepiece, said erecting system having a light dividing means, which is disposed in an optical path from said objective lens to a predetermined image plane of said objective lens, for penetrating a part of incident light and reflecting a part of the incident light; and
   means, which is disposed on a conjugate surface of said predetermined image plane, for receiving light penetrating through said light dividing means to measure brightness of an object which will be photographed.

10. An improved compact camera for automatically determining distance and light exposure measurements for photography, comprising:
   a camera body;
   a first photographic optical system mounted on the camera body for receiving light from an object at a first exterior position on the camera body, the first photographic optical system forming an image capable of being recorded by a film, and including a photo-taking lens at the first exterior position;
   a viewfinder optical system mounted on the camera body for receiving light from the object at a second exterior position on the camera body, the viewfinder optical system including an objective lens at the second position, an eyepiece, and an erecting image system disposed in an optical path from the objective lens to the eyepiece, the first exterior position being displaced on the camera body from the second exterior position, and
   means for receiving light rays from the object transmitted only through the viewfinder optical system to generate data representing the distance to the object from the camera for controlling the focus position of the first photographic optical system, including a sensor member positioned at a plane substantially conjugate with an image plane of the objective lens of the viewfinder optical system.

11. The camera of claim 10 further including means for receiving light rays from the object transmitted only through the viewfinder optical system to generate data representing the quantity of light from the object for controlling the exposure of a film through the photographic optical system and light dividing means in the erecting image system at a position in front of an image plane of the objective lens to divert a portion of the light rays from the object to the receiving means.

12. The camera of claim 11 further including a light projection means operatively positioned to project light only through the viewfinder optical system towards the object to enable a distance measurement in a low light condition.

* * * * *